(12) United States Patent
Stanton et al.

(10) Patent No.: US 10,599,007 B2
(45) Date of Patent: Mar. 24, 2020

(54) SYSTEMS AND METHODS FOR EFFICIENT OPTICAL FREQUENCY CONVERSION WITH INTEGRATED OPTICAL SYSTEMS

(71) Applicant: The Regents of the University of Colorado, a body corporate, Denver, CO (US)

(72) Inventors: Eric Stanton, Boulder, CO (US); Jeffrey Chiles, Boulder, CO (US)

(73) Assignees: The Regents of the University of Colorado, a body corporate, Denver, CO (US); Government of the United States of America, as represented by the Secretary of Commerce National Institute of Standards and Technology, Gaithersburg, MD (US)

(*) Notice: Subject to any disclaimer, the term of this patent is extended or adjusted under 35 U.S.C. 154(b) by 0 days.

(21) Appl. No.: 16/514,620

(22) Filed: Jul. 17, 2019

(65) Prior Publication Data

US 2020/0026148 A1    Jan. 23, 2020

Related U.S. Application Data

(60) Provisional application No. 62/699,423, filed on Jul. 17, 2018.

(51) Int. Cl.
| | | |
|---|---|---|
| *G02F 1/37* | (2006.01) | |
| *G02F 1/377* | (2006.01) | |
| *G02F 1/383* | (2006.01) | |
| *G02F 1/355* | (2006.01) | |
| *G02B 6/122* | (2006.01) | |

(Continued)

(52) U.S. Cl.
CPC ........... *G02F 1/377* (2013.01); *G02B 6/1223* (2013.01); *G02F 1/3558* (2013.01); *G02F 1/365* (2013.01); *G02F 1/383* (2013.01); *G02B 2006/12078* (2013.01); *G02B 2006/12178* (2013.01)

(58) Field of Classification Search
CPC .................................. G02F 1/365; G02F 1/377
See application file for complete search history.

(56) References Cited

U.S. PATENT DOCUMENTS

| | | | | |
|---|---|---|---|---|
| 5,109,462 A | * | 4/1992 | Watanabe ............... | G02F 1/377 359/328 |
| 8,873,133 B2 | * | 10/2014 | Vermeulen .............. | G02F 1/395 359/327 |

(Continued)

*Primary Examiner* — Daniel Petkovsek

(57) ABSTRACT

Various embodiments of the present technology provide a novel architecture for optical frequency conversion in a waveguide which can be applied to any suitable nonlinear waveguide material and any wavelength. In accordance with some embodiments, phase-matched bends can be used to increase the nonlinear interaction length. For example, the device can begin with a straight waveguide section with a width designed for phase-matching. When the straight waveguide section approaches the end of the chip, a bending waveguide section allows the waveguide to meander back in the opposite direction. Various embodiments of the bend can have a wider or narrower width to eliminate phase-matching for second harmonic generation (SHG) and instead provide a $2\pi$ phase-shift between the pump and signal light. Therefore, at the end of the bend, the pump and signal light are in-phase and a phase-matched width will continue the SHG process.

21 Claims, 7 Drawing Sheets

(51) Int. Cl.
*G02F 1/365* (2006.01)
*G02B 6/12* (2006.01)

(56) References Cited

U.S. PATENT DOCUMENTS 9,470,956 B2 * 10/2016 Mazur ............... G02F 1/355
9,915,852 B2 * 3/2018 Vermeulen ......... G02F 1/3544
2017/0256277 A1 * 9/2017 Peng ................ G11B 5/4866

* cited by examiner

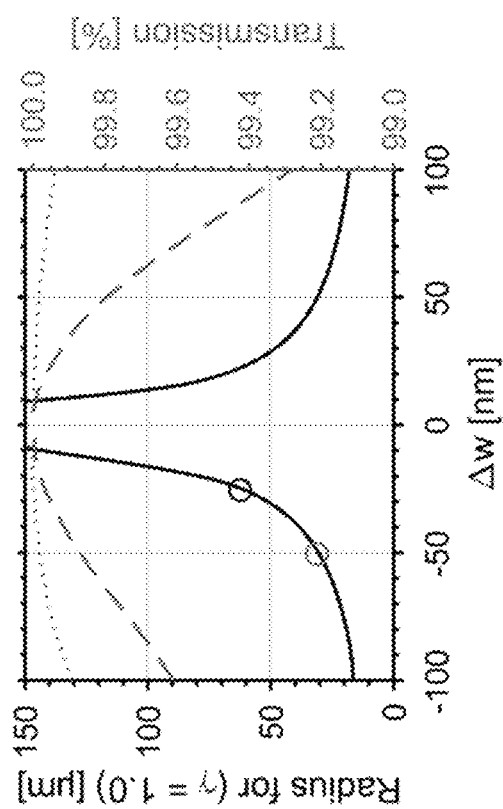
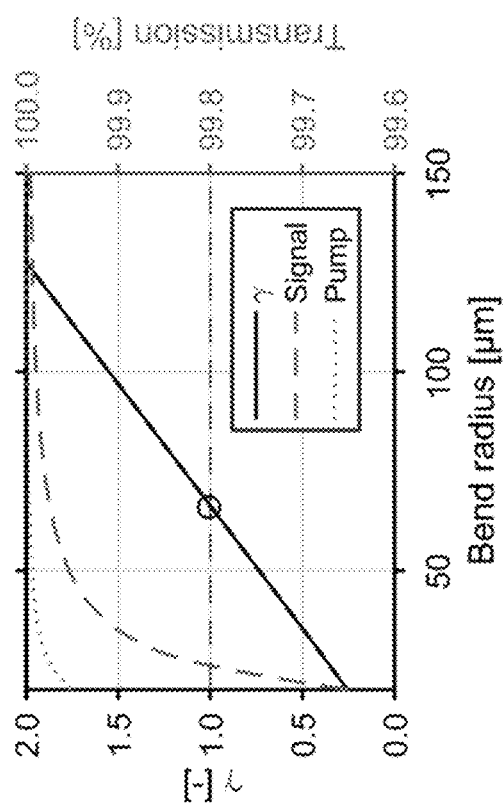
FIG. 3B
FIG. 3A

SYSTEMS AND METHODS FOR EFFICIENT OPTICAL FREQUENCY CONVERSION WITH INTEGRATED OPTICAL SYSTEMS

CROSS-REFERENCE TO RELATED APPLICATIONS

This application claims priority to U.S. Provisional Application Ser. No. 62/699,423 filed Jul. 17, 2018, which is incorporated herein by reference in its entirety for all purposes.

STATEMENT REGARDING FEDERALLY SPONSORED RESEARCH

This invention was made with government support under grant number 70NANB18H006 awarded by NIST. The government has certain rights in the invention.

TECHNICAL FIELD

Various embodiments of the present technology generally relate to waveguides. More specifically, some embodiments of the present technology relate to provide a novel architecture for efficient optical frequency conversion with integrated optical systems.

BACKGROUND

Efficient second harmonic generation (SHG) is desired for stabilizing octave-spanning frequency combs with the self-referencing technique. The low pump power level from a single (or a few) comb lines typically requires an amplifier before the SHG conversion to produce sufficient second-harmonic light for the self-referencing technique. Bulk SHG crystals are often used with free-space input and output beams. For example, many traditional systems use periodically-poled crystals for quasi phase-matching of the pump and signal light.

Recent developments have integrated similar SHG devices in waveguides, rather than free-space. Waveguides allow for a dramatic increase of the pump light intensity due to the smaller effective area of the optical mode, leading to a greater efficiency. These waveguide SHG devices generally are implemented with a straight waveguide section and facet couplers at the input and output. Some traditional systems have used a repetition of bends with alternating bend radius sign with the intent to broadening the conversion efficiency spectrum while decreasing the peak efficiency or used a bend meander to increase the interaction length, though the bends have the same waveguide width as the straight sections. Unfortunately, these traditional systems suffer from a phase-mismatch in the straight and bend sections and as a result, the conversion efficiency is very low.

SUMMARY

Various embodiments of the present technology generally relate to waveguides. More specifically, some embodiments of the present technology relate to provide a novel architecture for efficient optical frequency conversion with integrated optical systems. For example, some embodiments provide for a waveguide comprising multiple sections. The first section can have an input to receive pump light that generates a signal light throughout the waveguide. The pump light and signal light can be phase matched within the first section. The second section can be connected to the first section. The second section (e.g., a bended section) can be formed with a phase matched bend. The second section have a geometry that allows for a phase mismatch with the first section such that the phase output of the second section matches the phase of the input to the second section. The waveguide may be applied to phase-sensitive nonlinear optical processes, including, but not limited to, sum-frequency generation and difference-frequency generation.

In some embodiments, the phase matched bend can have a $\pi/2$ angle to create either a $\pi$ or $2\pi$ phase-shift between the pump light and the signal light depending on a sign-change of a second order nonlinear susceptibility at the $\pi/2$ angle. The second portion can include a non-phase-matched waveguide geometry to introduce a desired phase shift. For example, the non-phase-matched waveguide geometry can include modal dispersion for a specific bending radius, through a different waveguide width, or both.

Some embodiments of the waveguide may have a waveguide core (e.g., gallium arsenide) and one or more cladding layers (e.g., silicon dioxide) that include a uniform or composite material. For example, the cladding layers may include sub-layers of quantum wells that form an effective medium. In some embodiments, the waveguide core and/or cladding layers may be formed by deposition techniques (e.g., epitaxial growth or chemical-vapor deposition, or by wafer bonding techniques). The waveguide core may have a higher refractive index than the waveguide cladding in various embodiments. The cladding surrounding the waveguide may include a gaseous medium, such as air, or vacuum in some embodiments. In addition, the waveguide may be suspended via mechanical tethers that are the same material or a different material as the core.

The waveguide may include an intermediate layer formed between the waveguide core and the waveguide cladding. The waveguide core layer formed by direct bonding or adhesive bonding from a secondary substrate material to a primary substrate material. In addition, the waveguide core layer may be formed using selective die, selective area bonding, or full wafer-scale bonding.

In some embodiments, the waveguide may include non-linear materials that are uniform along the length of the waveguide to support modal or birefringent phase matching or periodically poled to support quasi phase-matching. The waveguide core, in some embodiments, may include gallium arsenide, indium phosphide, silicon nitride, aluminum gallium arsenide, gallium phosphide, silicon, tantalum pentoxide, lithium niobate, and/or aluminum nitride. The waveguide cladding, in various embodiments, may include silicon dioxide, silicon nitride, tantalum pentoxide, aluminum nitride, calcium fluoride, aluminum gallium arsenide, silicon oxynitride, and/or aluminum oxide.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

FIG. 3A shows a simulation shows the phase-matched condition parameter ($\gamma$) for a $\Delta w=-25$ nm and varying bend radii.

FIG. 3B shows a plot of varying values of $\Delta w$ and the bend radius where $\gamma=1.0$.

Figure 1:
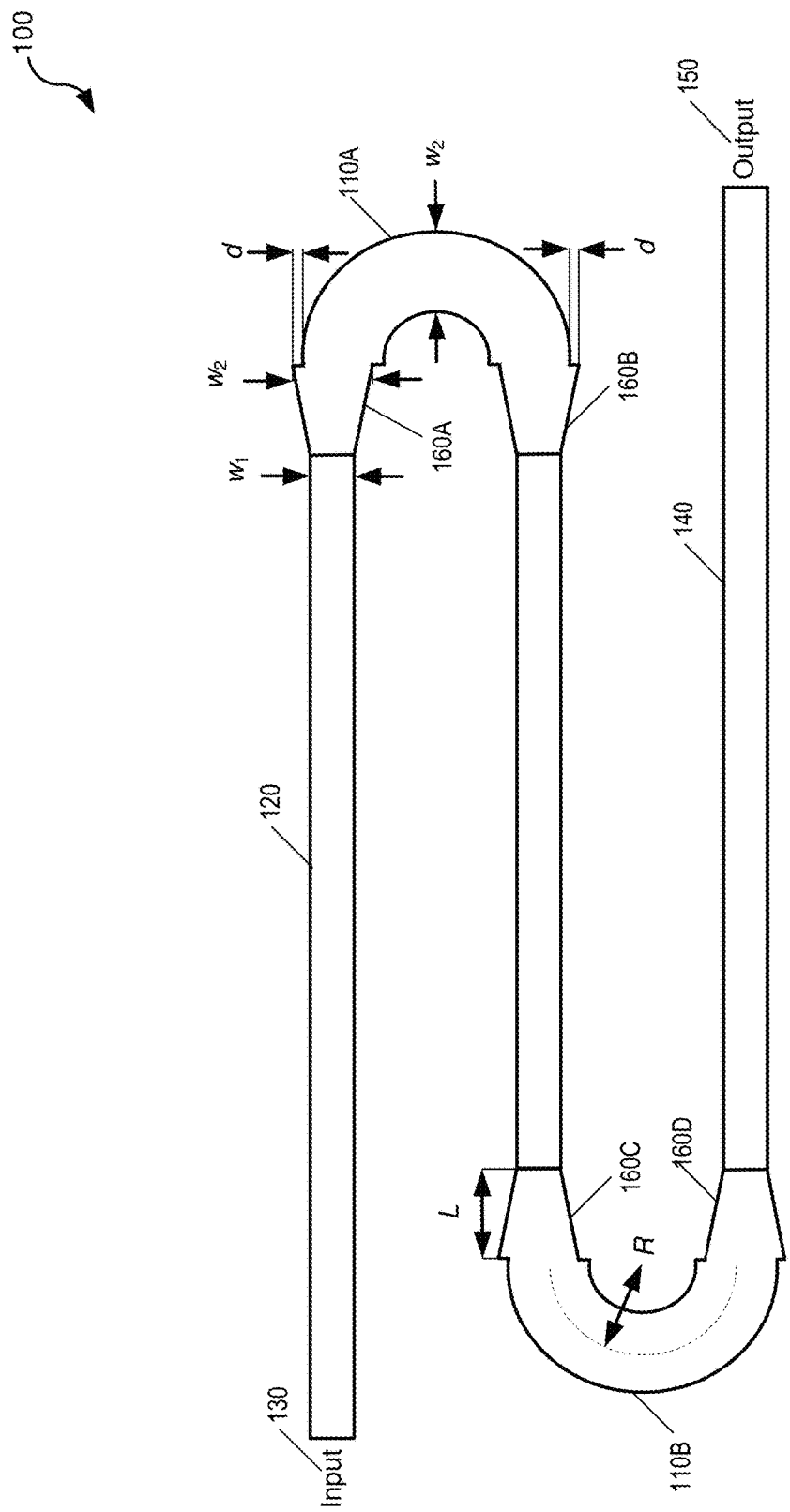
FIG. 1 provides a top view of a diagram of a waveguide that may be used in various embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments provide a novel architecture for optical frequency conversion in a waveguide. Some embodiments provide an increase in the conversion efficiency compared to existing architectures. The architecture used in various embodiments can be applied to any suitable nonlinear waveguide material and any wavelength.

In accordance with some embodiments, phase-matched bends can be used to increase the nonlinear interaction length. The device can begin with a straight waveguide section with a width designed for phase-matching. When the straight waveguide section approaches the end of the chip, a bending waveguide section allows the waveguide to meander back in the opposite direction. Various embodiments of the bend can have a wider or narrower width to eliminate phase-matching for second harmonic generation (SHG) and instead provide a $2\pi$ phase-shift between the pump and signal light. Therefore, at the end of the bend, the pump and signal light are in-phase and a phase-matched width will continue the SHG process. The necessary width difference between the straight and bending sections ($\Delta w = w_2 - w_1$) is generally small (<100 nm) so the taper length (L) can be very short (~5 µm long).

Various embodiments of the present technology enable significantly more efficient nonlinear optical frequency conversion to be obtained for any given constraints in chip size or pump power. Consequently, this makes it valuable for numerous applications where nonlinear optical frequency conversion is required. For example, any system requiring optical second harmonic generation would benefit from the higher efficiency, allowing smaller chips or lower pump powers to be used. Other more elaborate systems could benefit from this invention, such as optical frequency combs, which often require a second-harmonic generation module in order to allow direct detection of the comb's carrier envelope offset frequency. By using various embodiments of the present technology, the power budget of the overall system can be substantially reduced, and potentially the footprint as well. One can also envision applications where commercial laser light sources are available at some specific frequencies but are not mature at others such as the second harmonic frequency, or the difference frequency of two initial laser sources. In these cases, some embodiments can be used to efficiently convert light from one or more conventional light sources to new frequencies where other applications may benefit (e.g., spectroscopy, materials processing, LIDAR, and others).

Various embodiments of the present technology provide for a wide range of technical effects, advantages, and/or improvements to computing systems and components. For example, various embodiments include one or more of the following technical effects, advantages, and/or improvements: 1) efficient nonlinear optical frequency conversion; 2) use of wider or narrower width to eliminate phase-matching for second harmonic generation (SHG) and instead provide a $2\pi$ phase-shift between the pump and signal light; 3) increased efficiency in nonlinear optical frequency conversion for any given constraints in chip size or pump power; and/or 4) decrease the bandwidth of a nonlinear frequency conversion to promote one frequency conversion process over another.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 provides a top view of a diagram of a waveguide 100 that may be used in various embodiments of the present technology. In the embodiments illustrated in FIG. 1, each waveguide bend 110A-110B has identical dimensions. The first section 120 can have an input 130 to receive pump light that generates a signal light throughout the waveguide. The pump light and signal light can be phase matched within the first section 120. The second section has a waveguide bend 110A and is connected to the first section 120 which is straight in the embodiments illustrated in FIG. 1. The second section (e.g., a bended section) can be formed with a phase matched bend. The second section 110A can have a geometry that allows for a phase mismatch with the first section 120 such that the phase output of the second section 110A matches the phase of the input to the second section. Additional sections, such including waveguide bend 110B and section 140 may be included before output 150 is provided. The waveguide may be applied to phase-sensitive nonlinear optical processes, including, but not limited to, sum-frequency generation and difference-frequency generation.

In some embodiments, the phase matched bend can have a $\pi/2$ angle to create either a $\pi$ or $2\pi$ phase-shift between the pump light and the signal light depending on a sign-change of a second order nonlinear susceptibility at the π/2 angle. The second portion 110A can include a non-phase-matched waveguide geometry to introduce a desired phase shift. For example, the non-phase-matched waveguide geometry can include modal dispersion for a specific bending radius, through a different waveguide width, or both.

The waveguide width $w_1$ is designed to provide phase-matching between the pump wavelength transverse electric (TE) mode and the signal wavelength transverse magnetic (TM) mode. The bending waveguide width $w_2$ can be designed to create a 2π phase shift between the pump and signal modes. A linear taper 160A-160D can transition the waveguide between widths of $w_1$ and $w_2$. An offset of d increases the transmission from the straight waveguide mode to the bending waveguide mode. The taper transition can be designed by traditional waveguide propagation methods, including but not limited to the finite difference time domain method, the beam propagation method, or the eigenmode expansion method. This taper is only necessary to provide efficient coupling between these two sections. Other methods to provide efficient coupling between waveguides of different cross-sectional sizes can be used enable efficient coupling between these two waveguides.

In accordance with various embodiments, a phase-matched condition can be solved when the parameter, γ, is equal to unity. The formulation for this parameter is $$\gamma = \frac{4\pi\theta}{\phi} \frac{\Delta n}{\lambda_p},$$

where θ is the angle of the bend, φ is the relative phase shift between the pump and signal light, Δn is the difference in refractive index between the pump and signal light, and $\lambda_p$ is the pump wavelength.

Consider, in accordance with various embodiments, the design of a gallium arsenide (GaAs) waveguide with silicon dioxide cladding where θ=n, φ=2n, $\lambda_p$=2.0 µm, and Δn is found by solving the effective refractive indices of the waveguide. In this example, a channel waveguide with a core height of 135 nm and nominal width of 1085 nm was selected.

Figure 2:
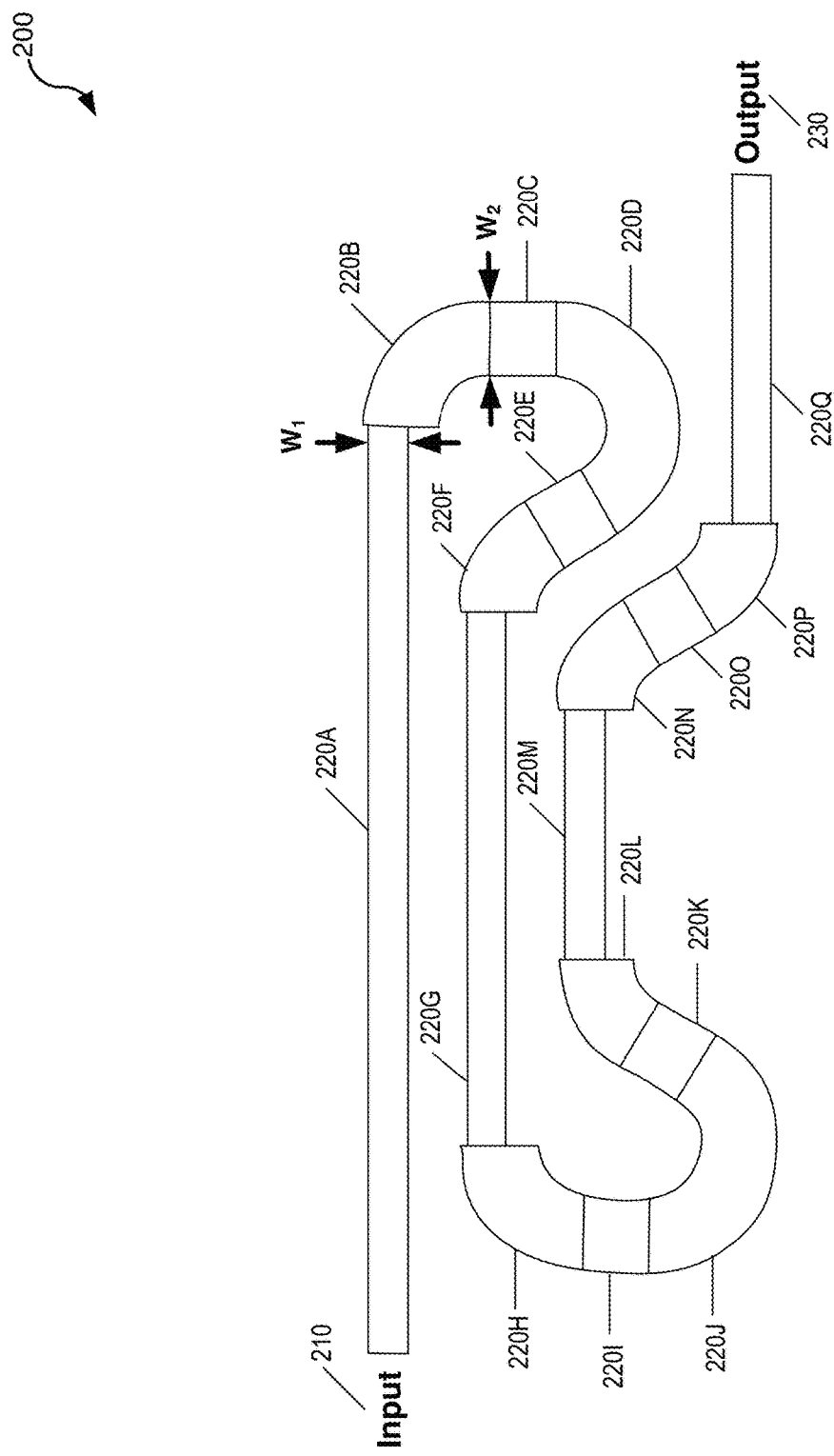
FIG. 2 provide a top view of a diagram of a waveguide that may be used in various embodiments of the present technology.

FIG. 2 provide a top view of a diagram of a waveguide 200 that may be used in various embodiments of the present technology. In the embodiments illustrated in FIG. 2, waveguide 200 is a planar optical waveguide with input 210 to accept light from one or more pumps. The light can travel through the various sections 220A-220Q to output 230. Sections 220A-220Q can include differing combinations of straight and bended waveguides connected in series, that is, the output of one is connected to the input of the next. The pump light and signal light can be phase matched within the first section 220A. Then each subsequent section can be designed to have a geometry that allows for a phase mismatch with the immediately previous section such that the phase output (of the current section) matches the phase of the input (to that section). In some cases where the nonlinear coefficients of the waveguide change sign when the direction of propagation changes, then the relative phase shift between sections may need to be adjusted to maximize the continuation of the nonlinear process.

In FIG. 3A, a simulation shows the phase-matched condition parameter (γ) for a Δw=−25 nm and varying bend radii. The phase-matched condition, plotted on the left axis with the solid line, indicates the relative phase between the pump and signal light after propagating through the bend section, scaled such that "1.0" corresponds to a 2π phase shift.

Assuming an offset of d=0 nm, the transmission of the pump and signal light is plotted in blue. For this waveguide material and geometry, an offset is not necessary since the transmission for both pump and signal light is greater than 99.5%. This calculation can be performed for varying values of Δw and the bend radius where γ=1.0 is plotted in FIG. 3B. The black circle shown in FIG. 3A corresponds to the black circle shown in FIG. 3B.

In FIG. 3B, the radius corresponding to a 2π phase shift is plotted for varying values of Δw. The black circle corresponds to the black circle in (a). In 3B, the green circle shows that for Δw=−50 nm, there is less sensitivity to variations in Δw and this smaller radius allows for a smaller device footprint while still allowing high transmission greater than 99.8%.

An experimental study may be necessary to determine the optimal Δw that would support a reproducible phase-matched bend with high transmission and a small size. Smaller bend radii result in a smaller size and reduced transmission of the pump and signal light. As stated previously though, an offset (d) can be introduced to minimize this bend-to-straight transition loss. However, in the regime presented here, the waveguides are strongly single-mode and transmission loss to the bend modes is therefore very low.

Various embodiments of the proposed architecture can have other advantages that make it desirable for commercialization. With this approach, a waveguide can be created in a smaller chip area than an equivalent straight waveguide, which could normally span several centimeters. In contrast, a maximum length of a few millimeters is sufficient with this novel approach. This allows greater yield in production and minimizes the effects of epitaxial layer nonuniformity that is present at longer length scales.

The phase matching method used in this example is form birefringence between the fundamental TE mode of the pump and the fundamental TM mode of the signal. Other methods of phase matching may also be used in conjunction with a bending section to preserve phase matching around a bend. For example, other types of form birefringence may be used by matching the phase between some combination of higher order modes or by using a TM polarized pump. Direct birefringence or a combination of direct and form birefringence is also possible using a birefringent crystal for one or multiple of the waveguide materials. Also, quasi-phase matching could be used by periodically poling a material such as lithium niobate or orientation patterning a material such as GaAs or AlGaAs. Quasi-phase matching can also be achieved using periodically bent waveguides, which are separate from the phase-preserving bend sections. Other methods for phase-matching can also be used with these phase-preserving bends.

Figure 4A:
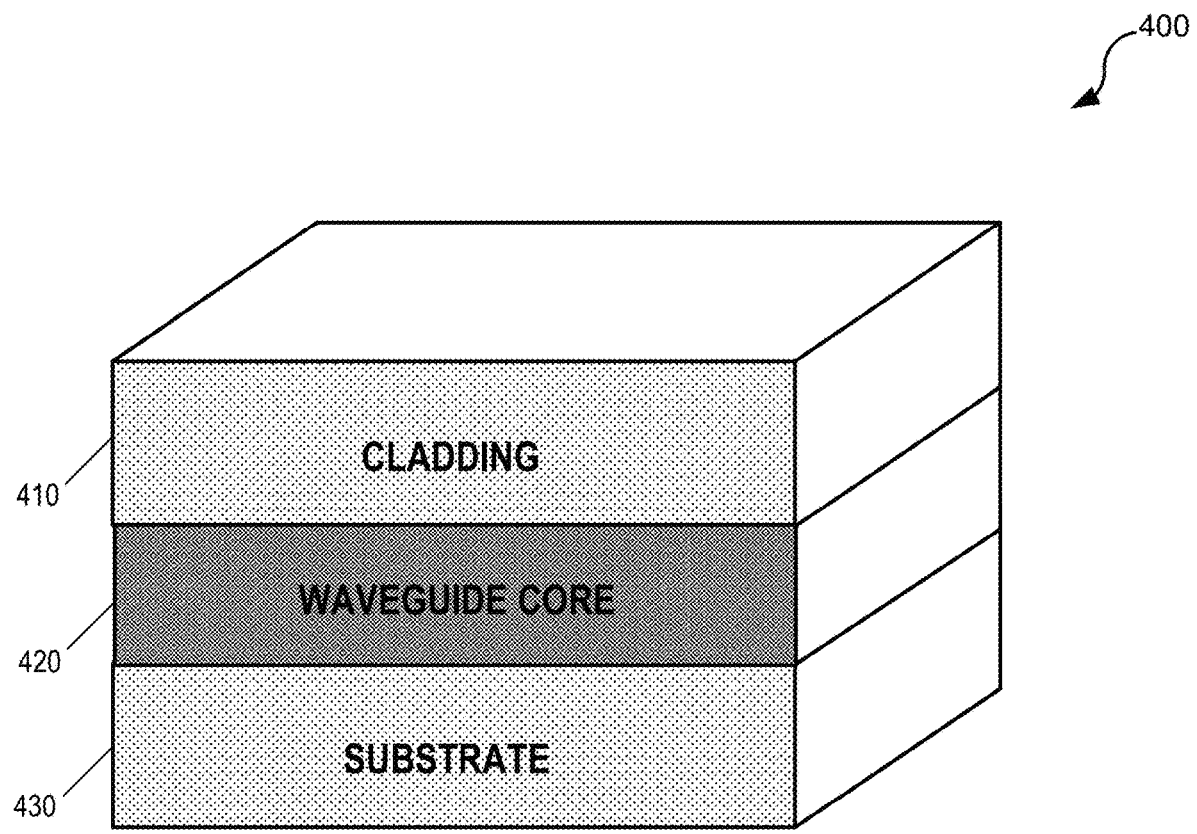
FIGS. 4A-4B are cross-sectional views of waveguides that may be used in accordance with various embodiments of the present technology.

FIG. 4A is a cross-sectional view of a waveguide 400 in accordance with various embodiments of the present technology. As illustrated in the embodiments shown in FIG. 4, waveguide 400 may include cladding 410 surrounding waveguide core 420 built on a substrate 430. Some embodiments of the waveguide 400 may have a waveguide core 420 (e.g., gallium arsenide) and one or more cladding layers (e.g., silicon dioxide) that include a uniform or composite material. For example, the cladding layers 410 may include sub-layers of quantum wells that form an effective medium. There are many other embodiments of a nonlinear waveguide in which this technology can be implemented.

In some embodiments, the waveguide core 420 and/or cladding layers 410 may be formed by deposition techniques (e.g., epitaxial growth or chemical-vapor deposition, or by wafer bonding techniques). The waveguide core 420 may have a higher refractive index than the waveguide cladding 410 in various embodiments. The cladding 410 surrounding the waveguide may include a gaseous medium, such as air, or vacuum in some embodiments. In addition, the waveguide may be suspended via mechanical tethers that are the same material or a different material as the waveguide core.

In some embodiments, the waveguide may include an intermediate layer (not shown) formed between the waveguide core 420 and the waveguide cladding 410. The waveguide core layer 420 formed by direct bonding or adhesive bonding from a secondary substrate material to a primary substrate material. In addition, the waveguide core layer 420 may be formed using selective die, selective area bonding, or full wafer-scale bonding.

Figure 4B:
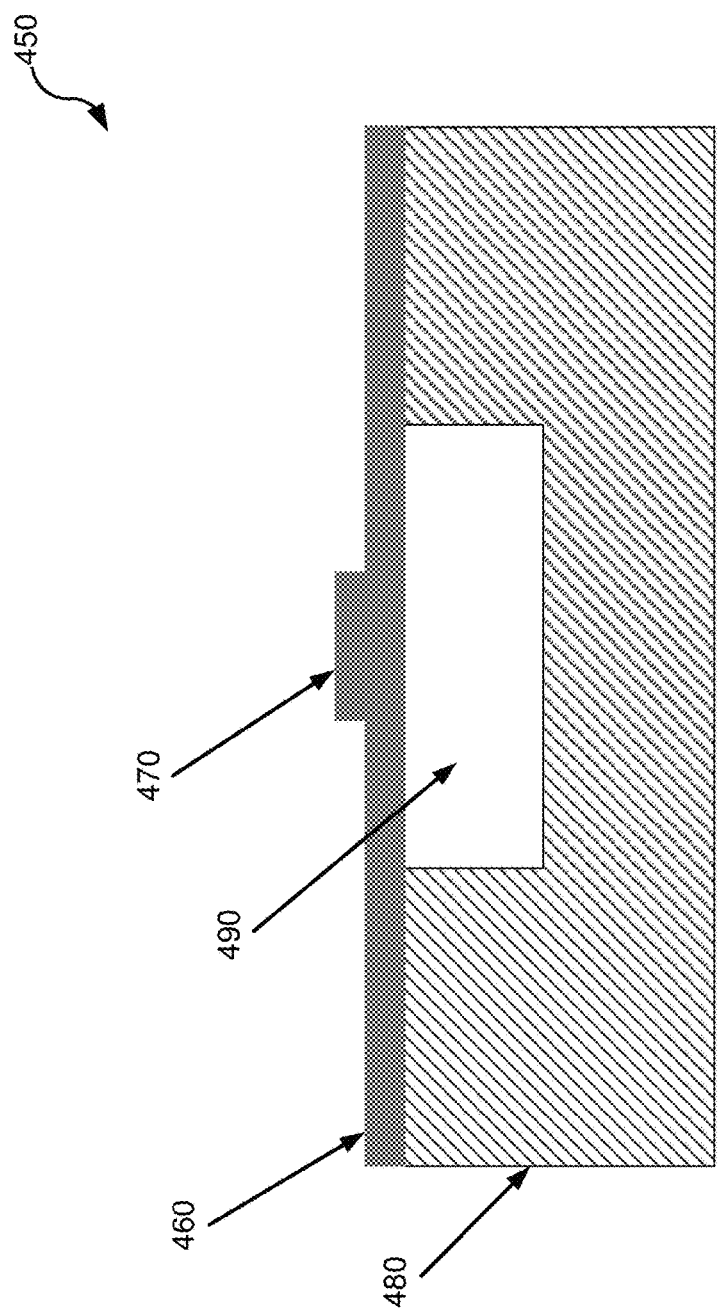

FIG. 4B is a cross-sectional view of a waveguide 450 in accordance with various embodiments of the present technology. In the embodiments illustrated in FIG. 4B, waveguide layer 460 which waveguide core 470 may be built on substrate 480 and suspended in air trench 490. The following reference, which is hereby incorporated by reference in its entirety for all purposes, describes examples of suspended silicon-membrane ridge waveguides that may be used in some embodiments: Chiles, Jeff & Khan, Saeed & Ma, Jichi & Fathpour, Sasan. (2013). High-contrast, all-silicon waveguiding platform for ultra-broadband mid-infrared photonics. Applied Physics Letters. 103. 151106-151106. 10.1063/1.4824771. In some embodiments a thin membrane of some waveguide material can be fused to a bulk substrate such as silicon using direct bonding methods. The bulk substrate may be pre-patterned with trenches, forming highly compact suspended membranes. Waveguides can then be formed by standard lithographic techniques on the membranes.

In some embodiments, the waveguide may include nonlinear materials that are uniform along the length of the waveguide to support modal or birefringent phase matching or periodically poled to support quasi phase-matching. The waveguide core, in some embodiments, may include gallium arsenide, indium phosphide, silicon nitride, aluminum gallium arsenide, gallium phosphide, silicon, tantalum pentoxide, lithium niobate, and/or aluminum nitride. The waveguide cladding, in various embodiments, may include silicon dioxide, silicon nitride, tantalum pentoxide, aluminum nitride, calcium fluoride, aluminum gallium arsenide, silicon oxynitride, and/or aluminum oxide.

Figure 5:
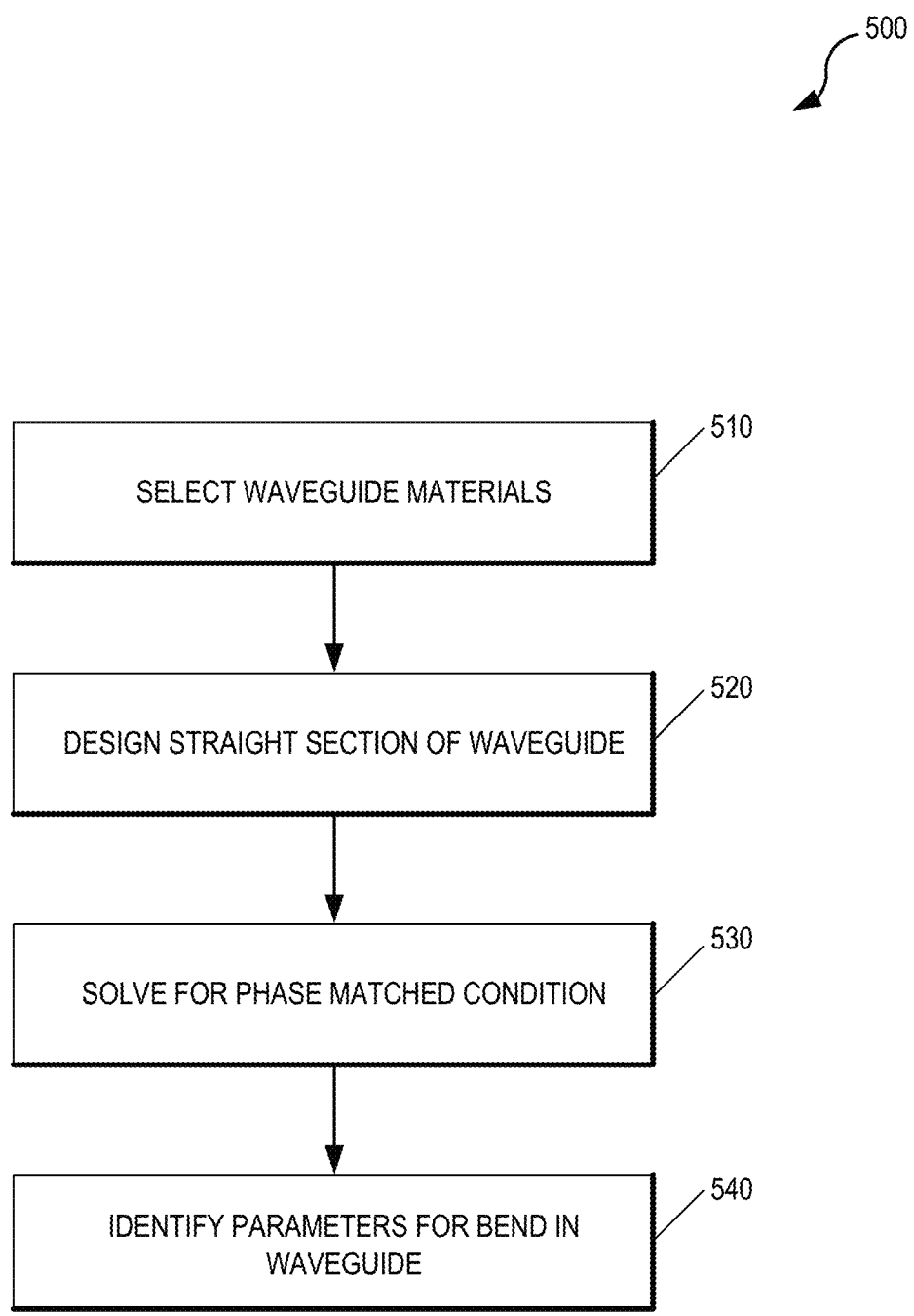
FIG. 5 is a flowchart illustrating an example of a set of operations for designing a waveguide according to one or more embodiments of the present technology.

FIG. 5 is a flowchart illustrating an example of a set of operations 500 for designing a waveguide according to one or more embodiments of the present technology. These operations may be performed by waveguide design tool running on a computer. The waveguide design tool may present various graphical user interfaces having drop down options, boxes for entering design constraints (e.g., values, materials, dimensions, etc.). As illustrated in FIG. 5, selection operation 510 allows the user to select a waveguide material. For example, the waveguide core material may be selected from gallium arsenide, indium phosphide, silicon nitride, aluminum gallium arsenide, gallium phosphide, silicon, tantalum pentoxide, lithium niobate, and/or aluminum nitride. The waveguide cladding may be selected to be silicon dioxide, silicon nitride, tantalum pentoxide, aluminum nitride, calcium fluoride, aluminum gallium arsenide, silicon oxynitride, aluminum oxide, and/or other appropriate material.

Design operation 520 can use the properties of the selected materials and information about the pump light to design a first section of the waveguide. The first section may be a straight section in which case design operation 520 computes the dimensions of the first section so that the phase of the pump light and signal light are matched. For each subsequently connected section, computation operation 530 solves for a phase match condition and uses identification operation 540 to identify parameters for a bend in the waveguide. In some embodiments, the design tool can simulate the design and create a design file for manufacture of the waveguide.

Exemplary Computer System Overview

Aspects and implementations of waveguide design tool of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 6:
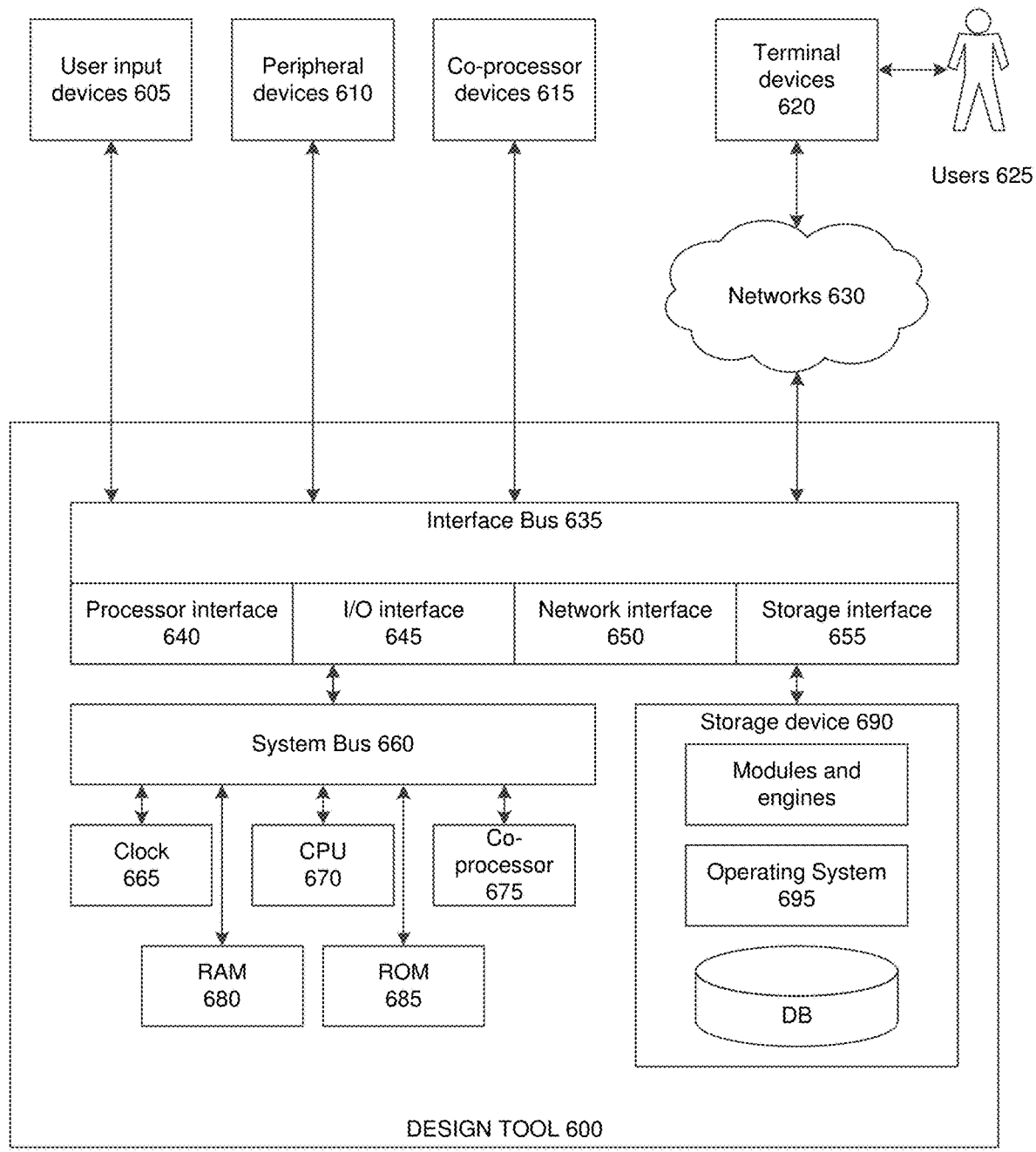
FIG. 6 illustrates an example of a computer system that may be used in one or more embodiments of the present technology.

FIG. 6 is a block diagram illustrating an example machine representing the computer systemization of the waveguide design tool. The tool 600 may be in communication with entities including one or more users 625 client/terminal devices 620, user input devices 605, peripheral devices 610, an optional co-processor device(s) (e.g., cryptographic processor devices) 615, and networks 630. Users may engage with the tool 600 via terminal devices 620 over networks 630.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The tool 600 may include clock 665, CPU 670, memory such as read only memory (ROM) 685 and random access memory (RAM) 680 and co-processor 675 among others. These controller components may be connected to a system bus 660, and through the system bus 660 to an interface bus 635. Further, user input devices 605, peripheral devices 610, co-processor devices 615, and the like, may be connected through the interface bus 635 to the system bus 660. The interface bus 635 may be connected to a number of interface adapters such as processor interface 640, input output interfaces (I/O) 645, network interfaces 650, storage interfaces 655, and the like.

Processor interface 640 may facilitate communication between co-processor devices 615 and co-processor 675. In one implementation, processor interface 640 may expedite encryption and decryption of requests or data. Input output interfaces (I/O) 645 facilitate communication between user input devices 605, peripheral devices 610, co-processor devices 615, and/or the like and components of the tool 600 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 650 may be in communication with the network 630. Through the network 630, the tool 600 may be accessible to remote terminal devices 620. Network interfaces 650 may use various wired and wireless connection protocols such as, direct connect, Ethernet, wireless connection such as IEEE 802.11a-x, and the like.

Examples of network 630 include the Internet, Local Area Network (LAN), Metropolitan Area Network (MAN), a Wide Area Network (WAN), wireless network (e.g., using Wireless Application Protocol WAP), a secured custom connection, and the like. The network interfaces 650 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 655 may be in communication with a number of storage devices such as, storage devices 690, removable disc devices, and the like. The storage interfaces 655 may use various connection protocols such as Serial Advanced Technology Attachment (SATA), IEEE 1394, Ethernet, Universal Serial Bus (USB), and the like.

User input devices 605 and peripheral devices 610 may be connected to I/O interface 645 and potentially other interfaces, buses and/or components. User input devices 605 may include card readers, finger print readers, joysticks, keyboards, microphones, mouse, remote controls, retina readers, touch screens, sensors, and/or the like. Peripheral devices 610 may include antenna, audio devices (e.g., microphone, speakers, etc.), cameras, external processors, communication devices, radio frequency identifiers (RFIDs), scanners, printers, storage devices, transceivers, and/or the like. Co-processor devices 615 may be connected to the tool 600 through interface bus 635, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The tool 600 may employ various forms of memory including on-chip CPU memory (e.g., registers), RAM 680, ROM 685, and storage devices 690. Storage devices 690 may employ any number of tangible, non-transitory storage devices or systems such as fixed or removable magnetic disk drive, an optical drive, solid state memory devices and other processor-readable storage media. Computer-executable instructions stored in the memory may include one or more program modules such as routines, programs, objects, components, data structures, and so on that perform particular tasks or implement particular abstract data types. For example, the memory may contain operating system (OS) component 695, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The design tool 600 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the design tool 600 may be distributed electronically over the Internet or over other networks (including wireless networks). Those skilled in the relevant art(s) will recognize that portions of the system may reside on a server computer, while corresponding portions reside on a client computer. Data structures and transmission of data particular to aspects of the design tool 600 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A waveguide comprising:
   a first section to receive pump light that generates a signal light throughout the waveguide,
      wherein within the first section the pump light and the signal light are phase matched; and
   a second section connected to the first section,
      wherein the second section is formed with a phase matched bend; and
      wherein the second section has a phase mismatch with the first section such that the phase output of the second section matches the phase of the input to the second section.

2. The waveguide of claim 1, wherein the phase matched bend has a $\pi/2$ angle to create either a $\pi$ or $2\pi$ phase-shift between the pump and the signal light depending on a sign-change of a second order nonlinear susceptibility at the $\pi/2$ angle.

3. The waveguide of claim 1, wherein the phase matched bend has a $\pi$ angle to create either a $\pi$ or $2\pi$ phase-shift between the pump and the signal light.

4. The waveguide of claim 1, wherein the second section includes non-phase-matched waveguide geometry to introduce a desired phase shift.

5. The waveguide of claim 4, wherein the non-phase-matched waveguide geometry includes modal dispersion for a specific bending radius, through a different waveguide width, or both.

6. The waveguide of claim 1, further comprising a waveguide core and cladding layers that include a uniform or composite material.

7. The waveguide of claim 6, wherein the cladding layers include sub-layers of quantum wells that form an effective medium.

8. The waveguide of claim 6, wherein the waveguide core and the cladding layers are formed by deposition techniques.

9. The waveguide of claim 8, wherein the deposition techniques include epitaxial growth or chemical-vapor deposition, or by wafer bonding techniques.

10. The waveguide of claim 1, further comprising nonlinear materials that are uniform along the length of the waveguide to support modal or birefringent phase matching or periodically poled to support quasi phase-matching.

11. The waveguide of claim 1, further comprising a waveguide core of gallium arsenide and a cladding layer of silicon dioxide.

12. The waveguide of claim 1, further comprising a waveguide core with a higher refractive index than a waveguide cladding.

13. The waveguide of claim 12, wherein the waveguide core comprises gallium arsenide, indium phosphide, silicon nitride, aluminum gallium arsenide, gallium phosphide, silicon, tantalum pentoxide, lithium niobate, or aluminum nitride.

14. The waveguide of claim 12, wherein the waveguide cladding comprises silicon dioxide, silicon nitride, tantalum pentoxide, aluminum nitride, calcium fluoride, aluminum gallium arsenide, silicon oxynitride, or aluminum oxide.

15. The waveguide of claim 12, further comprising an intermediate layer formed between the waveguide core and the waveguide cladding.

16. The waveguide of claim 1, further comprising a waveguide core layer formed by direct bonding or adhesive bonding from a secondary substrate material to a primary substrate material.

17. The waveguide of claim 16, wherein the waveguide core layer is formed using selective die bonding, full wafer-scale bonding, or selective area bonding.

18. The waveguide of claim 1, further comprising a cladding surrounding the waveguide, wherein the cladding includes a gaseous medium or vacuum, and wherein the waveguide is suspended via mechanical tethers that are the same material or a different material as a core.

19. The waveguide of claim 1, applied to phase-sensitive nonlinear optical processes for sum-frequency generation and difference-frequency generation.

20. An optical waveguide comprising:
   a first section to receive pump light that generates a signal and idler light throughout the waveguide, wherein within the first section the pump light and signal and the idler light are phase matched; and a bended section connected to the first section,
wherein the bended section has a phase mismatch with the first section such that the phase output of the bended section matches the phase of the input to the bended section.

21. An optical waveguide comprising:
a first section to receive pump light that generates a signal light throughout the waveguide,
wherein within the first section the pump light and the signal light are phase matched; and one or more additional sections interconnected and at least one of the one or more additional sections having phase matched bends to create either a desired phase-shift between the pump light and the signal light via a phase mismatch between the one or more additional sections having bends.

\* \* \* \* \*